United States Patent
Lin et al.

(10) Patent No.: US 9,668,106 B2
(45) Date of Patent: May 30, 2017

(54) INDOOR POSITIONING SYSTEM AND METHOD FOR INDOOR POSITION

(71) Applicant: HON HAI PRECISION INDUSTRY CO., LTD., New Taipei (TW)

(72) Inventors: Yi-Cheng Lin, New Taipei (TW); Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/837,869

(22) Filed: Aug. 27, 2015

(65) Prior Publication Data
US 2016/0353248 A1 Dec. 1, 2016

(30) Foreign Application Priority Data
May 28, 2015 (TW) .............................. 104117106 A

(51) Int. Cl.
*H04W 4/04* (2009.01)
*H04W 4/00* (2009.01)
*H04W 4/02* (2009.01)

(52) U.S. Cl.
CPC ............. *H04W 4/04* (2013.01); *H04W 4/008* (2013.01); *H04W 4/021* (2013.01)

(58) Field of Classification Search
CPC ........ H04W 4/04; H04W 4/008; H04W 4/021
See application file for complete search history.

(56) References Cited

U.S. PATENT DOCUMENTS

| | | | | |
|---|---|---|---|---|
| 5,960,366 A | * | 9/1999 | Duwaer | G04G 21/04 368/13 |
| 9,084,013 B1 | * | 7/2015 | Arini | H04N 21/44204 |
| 2002/0068600 A1 | * | 6/2002 | Chihara | H04B 1/385 455/557 |
| 2009/0305631 A1 | * | 12/2009 | Walley | G06F 1/14 455/41.2 |
| 2011/0007777 A1 | * | 1/2011 | Haartsen | H04B 1/69 375/130 |
| 2013/0183999 A1 | * | 7/2013 | Jovicic | G01S 19/48 455/456.1 |
| 2014/0087752 A1 | * | 3/2014 | Zhu | H04W 24/00 455/456.1 |
| 2014/0362544 A1 | * | 12/2014 | Han | G04G 17/06 361/749 |
| 2015/0296480 A1 | * | 10/2015 | Kinsey | H04M 19/047 455/41.3 |
| 2015/0351686 A1 | * | 12/2015 | Su | A61B 5/002 600/301 |

* cited by examiner

*Primary Examiner* — Joseph Dean, Jr.
(74) *Attorney, Agent, or Firm* — Steven Reiss

(57) ABSTRACT

The BLUETOOTH® indoor positioning system can include a plurality of mobile phones forming a signal coverage area indoor and a server. The mobile phone is configured to transmit, receive BLUETOOTH® signals and generate, transmit position information. The server is configured to receive the position information and process the position information to be position coordinates. A method for BLUETOOTH® indoor position executed by a BLUETOOTH® indoor positioning system is also provided. A wearable terminal is also provided.

8 Claims, 5 Drawing Sheets

INDOOR POSITIONING SYSTEM AND METHOD FOR INDOOR POSITION

FIELD

The subject matter herein generally relates to positioning systems, and particularly to a BLUETOOTH® indoor positioning system using a wearable terminal.

BACKGROUND

Positioning technology can be divided into actions on the basis of satellite and network. The positioning technology with satellite requires equipment to support the satellites. The positioning technology can also be network based having enough base stations to provide signal to the device.

BRIEF DESCRIPTION OF THE DRAWINGS

Implementations of the present technology will now be described, by way of example only, with reference to the attached figures.

DETAILED DESCRIPTION

Figure 1:
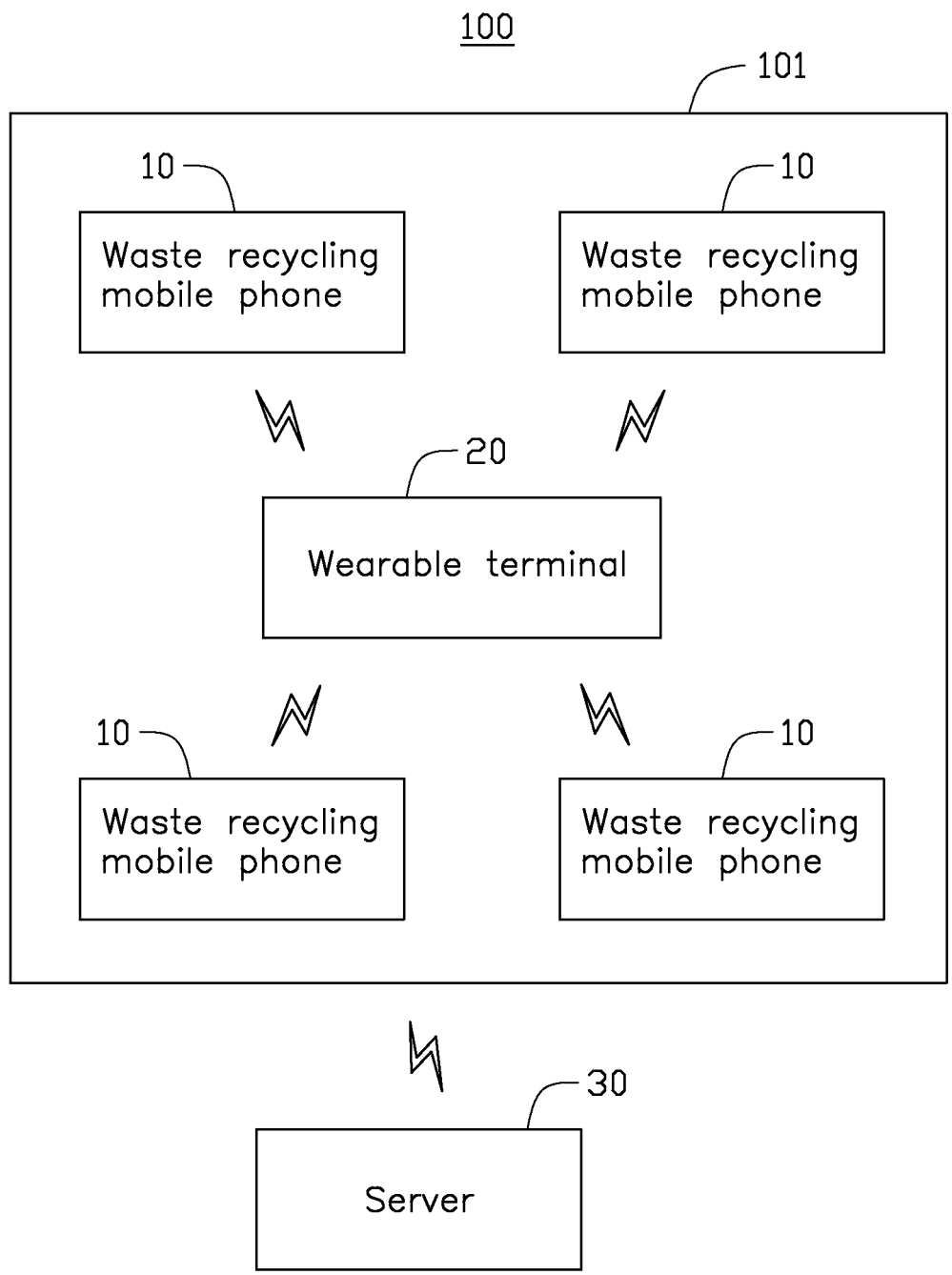
FIG. 1 is a diagrammatic view of a BLUETOOTH® indoor positioning system in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a BLUETOOTH® indoor positioning system. The BLUETOOTH® indoor positioning system can include a plurality of mobile phones forming a signal coverage area indoor and a server. The mobile phone is configured to transmit, receive BLUETOOTH® signals and generate, transmit position information. The server is configured to receive the position information and process the position information to be position coordinates.

The present disclosure is described further in relation to a method for BLUETOOTH® indoor position executed by a BLUETOOTH® indoor positioning system. The BLUETOOTH® indoor positioning system can include a plurality of mobile phones, a wearable terminal and a server. Each of the mobile phone can include a BLUETOOTH® signal transmitter, a position information receiver, a position information transmission module and a BLUETOOTH® RF antenna. The wearable terminal can include a BLUETOOTH® signal detecting module, a BLUETOOTH® signal feedback module, an information receiver. The server can include a position information receiver and a data processing module. The method can include the followings. A signal coverage area is provided by a plurality of mobile phones in an indoor location. The BLUETOOTH® signal transmitter of the mobile phone transmits BLUETOOTH® signals to outside via the BLUETOOTH® RF antenna of the mobile phone. The signal coverage area is detected by the BLUETOOTH® signal detecting module of the wearable terminal. The BLUETOOTH® signals are fed back by the BLUETOOTH® signal feedback module of the wearable terminal to the plurality of mobile phones via the BLUETOOTH® RF antenna of the wearable terminal. The BLUETOOTH® signals are received by the position information receiver of the mobile phone via the BLUETOOTH® RF antenna of the mobile phone, and position information of the wearable terminal is automatically generated. The position information is transmitted to the server by the position information transmission module of the mobile phone via the BLUETOOTH® RF antenna of the mobile phone. The position information of the wearable terminal is received by the position information receiver of the server. The position information of the wearable terminal is processed by the data processing module of the server to be position coordinates.

The present disclosure is described further in relation to a wearable terminal. The wearable terminal can include a short range wireless receiver configured to receive data via the short range wireless protocol. The received data is from a server that is configured to receive position information from a plurality of mobile phones configured to transmit and receive short range wireless signals and to generate and transmit position information. The received data is position coordinates that are generated by the server in response to receive the position information from the plurality of mobile phones.

FIG. 1 illustrates a BLUETOOTH® positioning system 100 of an embodiment. The BLUETOOTH® positioning system 100 can include a BLUETOOTH® signal terminal 101 and a server 30. The BLUETOOTH® signal terminal 101 can include a plurality of mobile phones 10 and a plurality of wearable terminals 20. The mobile phones 10 are configured to transmit, receive BLUETOOTH® signals and generate, transmit position information. In this embodiment, the mobile phones 10 can be waste recycling mobile phones. The wearable terminals 20 is configured to detect the signal coverage area and feed back the BLUETOOTH® signals to the mobile phones 10. The server 30 is configured to receive and process the position information to be position coordinates.

The plurality of mobile phones 10 are positioned in different preset locations of an indoor location. The plurality of mobile phones 10 cooperatively form a signal coverage area.

Figure 2:
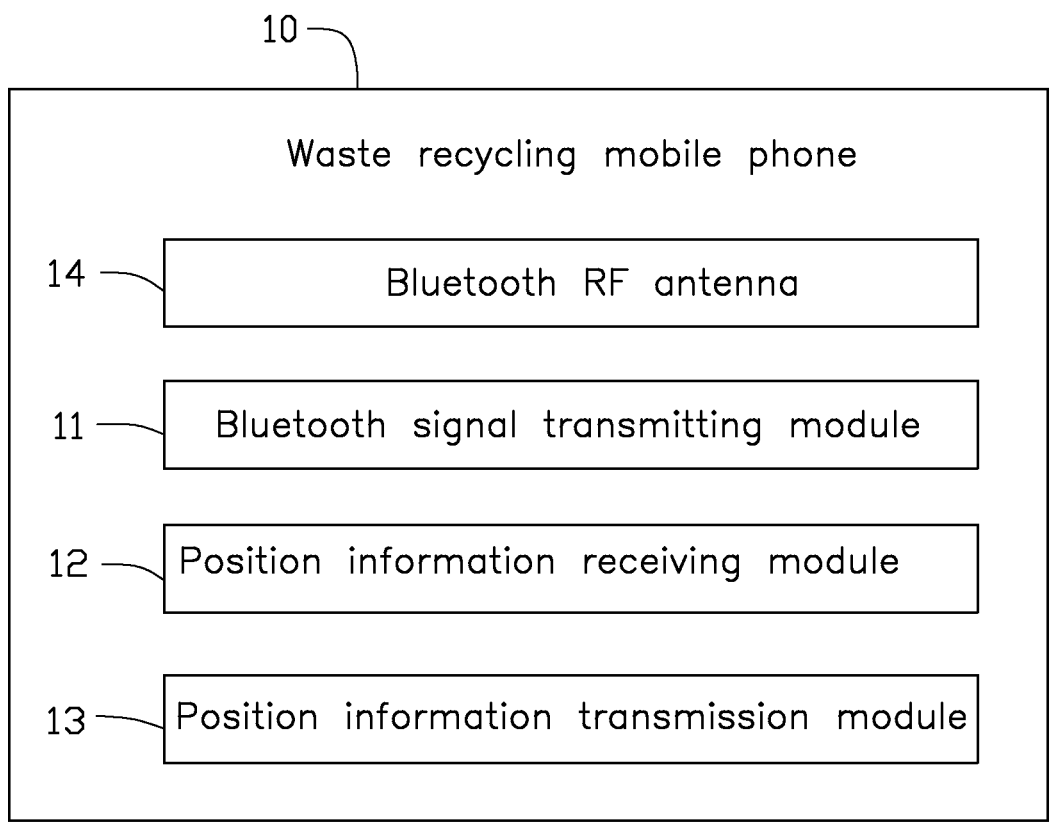
FIG. 2 is a diagrammatic view of a mobile phone of the BLUETOOTH® indoor positioning system in FIG. 1.

FIG. 2 illustrates that each mobile phone 10 can include a BLUETOOTH® signal transmitter 11, a position information receiver 12, a position information transmission module 13 and a BLUETOOTH® RF antenna 14.

The BLUETOOTH® signal transmitter 11 is configured to transmit BLUETOOTH® signals to outside via the BLUETOOTH® RF antenna 14, the BLUETOOTH® signals can be detected by the wearable terminals 20 which have BLUETOOTH® modules.

The position information receiver 12 is configured to receive BLUETOOTH® signals from the wearable terminals 20 which have BLUETOOTH® modules via the BLUETOOTH® RF antenna 14 and automatically generate position information.

The position information transmission module 13 is configured to transmit the position information to the server 30 via the BLUETOOTH® RF antenna 14.

In at least one embodiment, the BLUETOOTH® signal terminal 101 can include low-energy BLUETOOTH® module which can save power.

A number of the mobile phones 10 can be at least four which can determine a three dimensional position. The number of the mobile phones 10 can be more to form a larger signal coverage area, when the indoor location using the BLUETOOTH® indoor positioning system is big.

Figure 3:
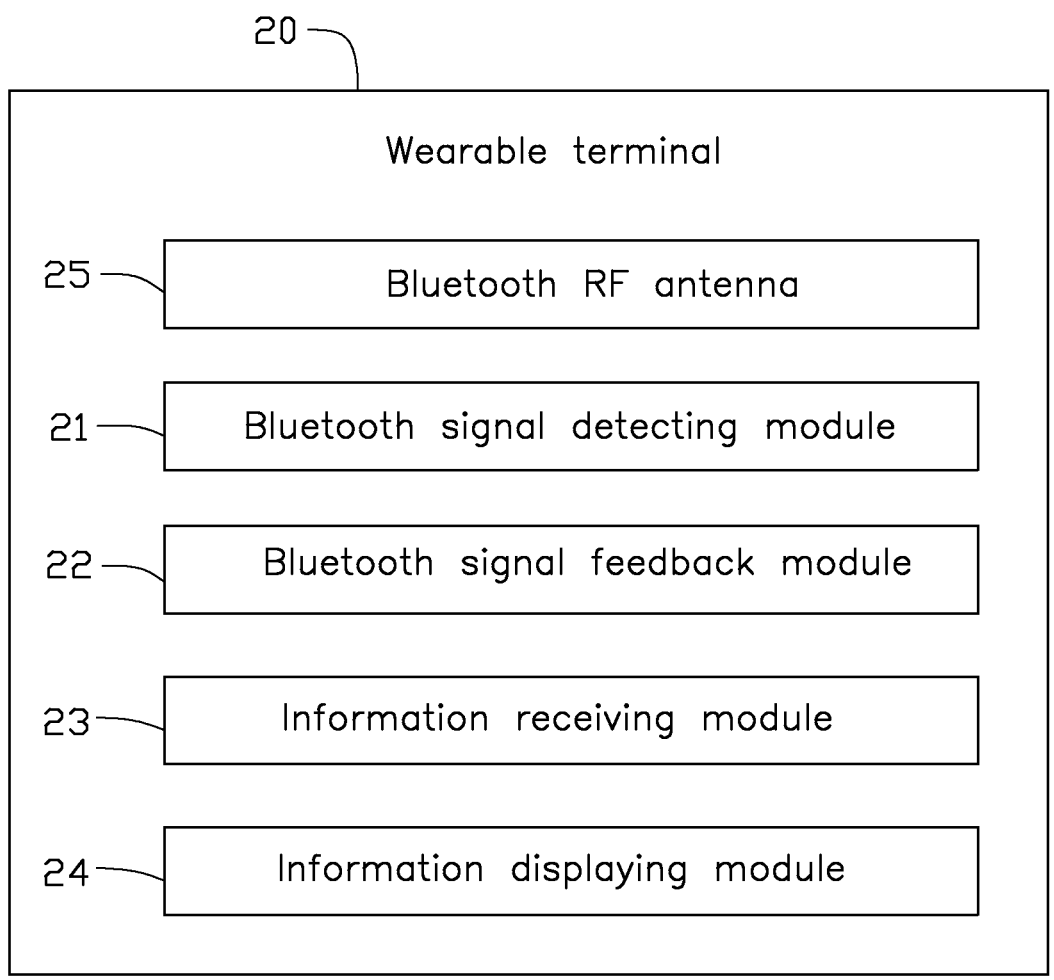
FIG. 3 is a diagrammatic view of a wearable terminal of the BLUETOOTH® indoor positioning system in FIG. 1.

FIG. 3 illustrates that the wearable terminal 20 can include a BLUETOOTH® signal detecting module 21, a BLUETOOTH® signal feedback module 22, an information receiver 23, an information displaying module 24 and a BLUETOOTH® RF antenna 25. The wearable terminal 20 can be a bracelet, a watch, a glasses, an accessory, a footwear, a helmet, a book bag, a shopping bag, a crutch, a costume or other wearable device.

The BLUETOOTH® signal detecting module 21 is configured to detect the signal coverage area formed by the plurality of mobile phones 10.

The BLUETOOTH® signal feedback module 22 is configured to feed back the BLUETOOTH® signals to the mobile phone 10 via the BLUETOOTH® RF antenna 25, when the BLUETOOTH® signal detecting module 21 detects that the wearable terminal 20 enters the signal coverage area formed by the plurality of mobile phones 10.

The information receiver 23 is configured to receive information pushed by the server 30.

The information displaying module 24 is configured to display the information pushed by the server 30.

In at least one embodiment, the wearable terminal 20 cannot include the information receiver 23 and the information displaying module 24.

In at least one embodiment, the wearable terminal 20 can further include an information remind module. The information reminding module can remind the wearer the information, in a form of light or sound. For an example, the information reminding module reminds the wearer that the wearer have entered the signal coverage area formed by the plurality of mobile phones 10, in a form of permanent bright light. For another example, the information reminding module reminds the wearer that the business time will come, in a form of flare light or sound.

Figure 4:
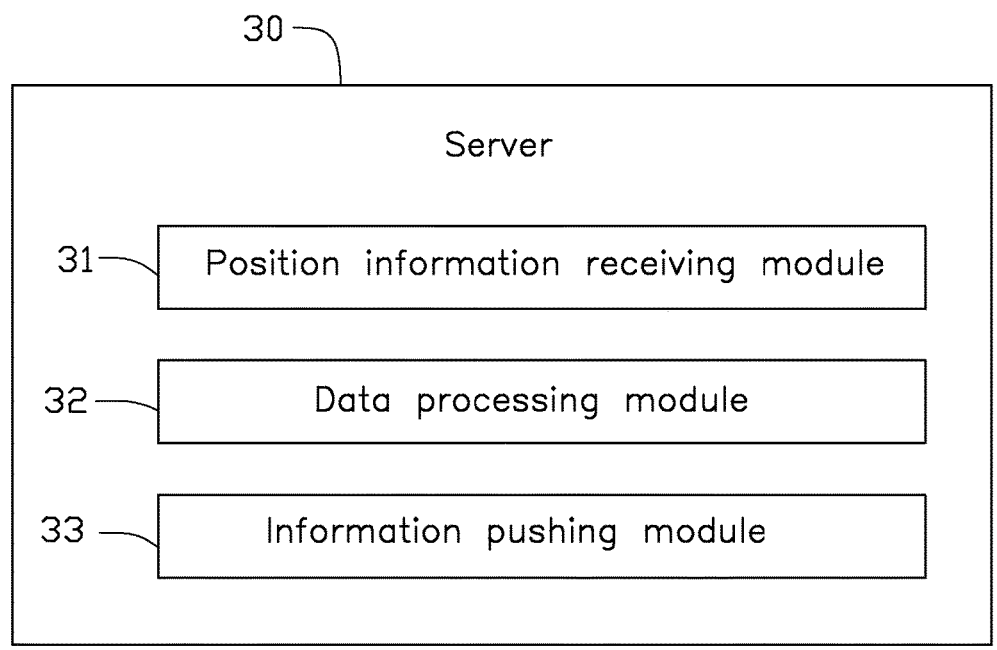
FIG. 4 is a diagrammatic view of a server of the BLUETOOTH® indoor positioning system in FIG. 1.

FIG. 4 illustrates that the server 30 can include a position information receiver 31, a data processing module 32 and an information pushing module 33.

The position information receiver 31 is configured to receive position information of the wearable terminal 20 from the position information transmission module 13 of the mobile phone 10.

The data processing module 32 is configured to process the position information of the wearable terminal 20 to be position coordinates, which realizes to position the wearable terminal 20 which enters the signal coverage area formed by the plurality of mobile phones 10.

The information pushing module 33 is configured to push business information to the wearable terminal 20 according to the position coordinates from the data processing module 32.

In at least one embodiment, the server 30 cannot include the information pushing module 33.

Figure 5:
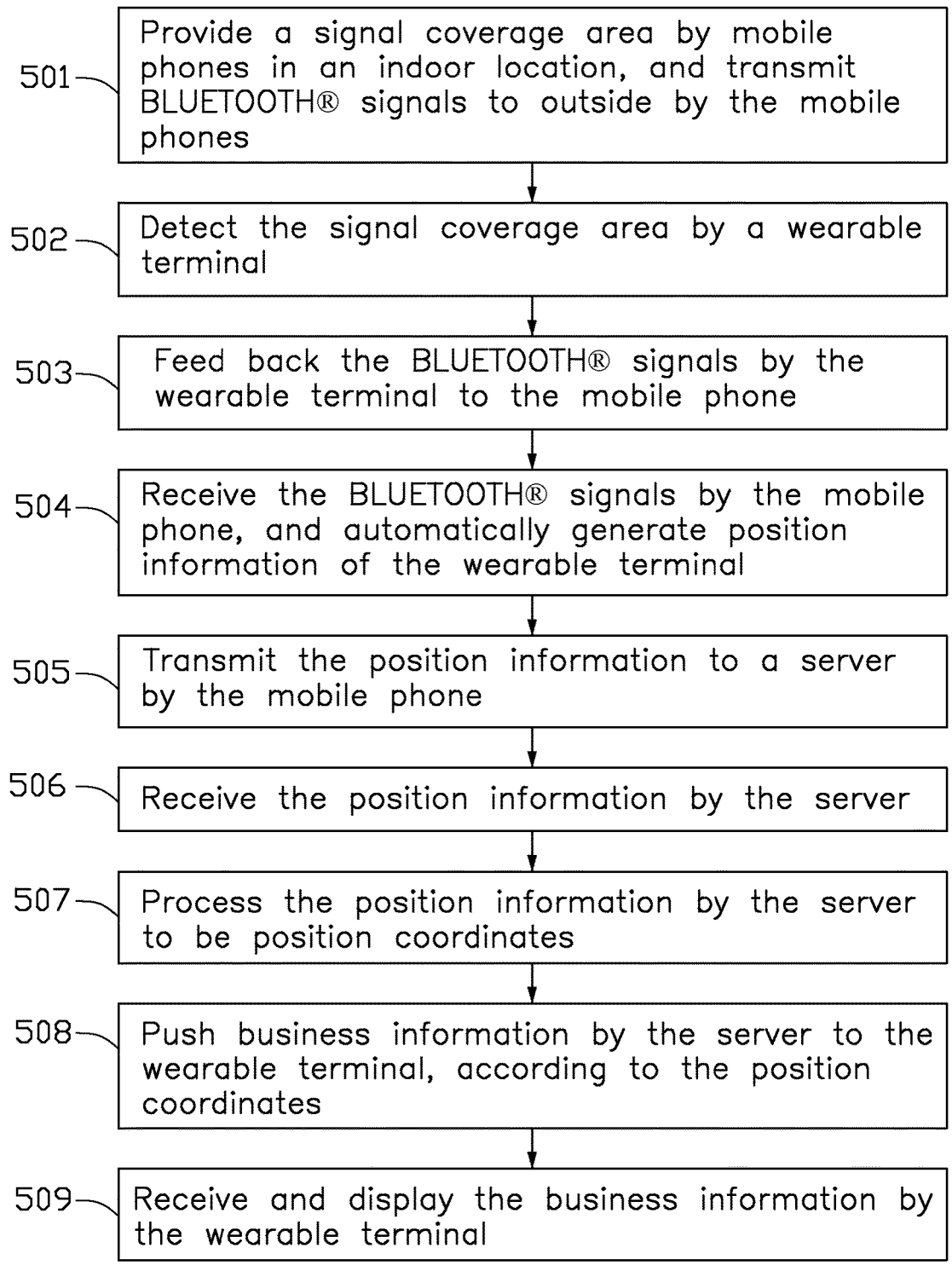
FIG. 5 is a flowchart showing a method for BLUETOOTH® indoor position in accordance with an embodiment of the present disclosure.

FIG. 5 illustrates a flowchart of an example method for BLUETOOTH® indoor position. The example method is provided by way of example, as there are a variety of ways to carry out the method. The example method described below can be carried out using the configurations illustrated in FIGS. 1-4, for example, and various elements of this figure are referenced in explaining the example method. Each block shown in FIG. 5 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 501.

At block 501, the signal coverage area formed by the plurality of mobile phones 10 is provided in an indoor location such as a shopping mall, a hospital, a library, or other indoor locations. The BLUETOOTH® signal transmitter 11 of the mobile phone 10 transmits BLUETOOTH® signals to outside via the BLUETOOTH® RF antenna 14 of the mobile phone 10.

At block 502, the BLUETOOTH® signal detecting module 21 of the wearable terminal 20 detects the signal coverage area, when the wearable terminal 20 enters the signal coverage area formed by the plurality of mobile phones 10.

At block 503, the BLUETOOTH® signal feedback module 22 of the wearable terminal 20 feeds back the BLUETOOTH® signals to the plurality of mobile phones 10 via the BLUETOOTH® RF antenna 25 of the wearable terminal 20.

At block 504, the position information receiver 12 of the mobile phone 10 receives the BLUETOOTH® signals via the BLUETOOTH® RF antenna 14 and automatically generates position information.

At block 505, the position information transmission module 13 of the mobile phone 10 transmits the position information to the server 30 via the BLUETOOTH® RF antenna 14 of the mobile phone 10.

At block 506, the position information receiver 31 of the server 30 receives the position information of the wearable terminal 20.

At block 507, the data processing module 32 of the server 30 processes the position information of the wearable terminal 20 to be position coordinates, which realizes to position the wearable terminal 20 which enters the signal coverage area formed by the plurality of mobile phones 10.

Furthermore, the method for indoor position can further include steps in block 208 and block 209.

At block 508, the information pushing module 33 of the server 30 pushes business information such as security alert information, process reminding information and advertising information to the wearable terminal 20, according to the position coordinates from the data processing module 32.

At block 509, the information receiver 23 of the wearable terminal 20 receives the business information pushed by the server 30, the information displaying module 24 of the wearable terminal 20 displays the business information pushed by the server 30 for the wearer.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A BLUETOOTH® indoor positioning system comprising:
a plurality of mobile phones forming a signal coverage area indoor, and configured to transmit, receive BLUETOOTH® signals and generate, transmit position information; a server configured to receive the position information and process the position information to be position coordinates; and a wearable terminal comprising: a BLUETOOTH® RF antenna; a BLUETOOTH® signal receiver, receiving a signal coverage area formed by the plurality of mobile phones; and a BLUETOOTH® signal feeder, feeding back a BLUETOOTH® signals to the plurality of mobile phones via the BLUETOOTH® RF antenna of the wearable terminal, when the BLUETOOTH® signal receiver receiving the signal coverage area formed by the plurality of mobile phones; wherein each of the mobile phones comprises a BLUETOOTH® signal transmitter, a position information receiver, a position information transmitter and a BLUETOOTH® RF antenna; wherein the BLUETOOTH® signal transmitters are configured to transmit BLUETOOTH® signals via the BLUETOOTH® RF antennas of the plurality of mobile phones; wherein the position information receiver of the plurality of mobile phones is configured to receive the BLUETOOTH® signals fed back by the wearable terminal via the BLUETOOTH® RF antennas of the plurality of mobile phones, and automatically generate position information of the wearable terminal, and transmit the position information to the server via the BLUETOOTH® RF antennas of the plurality of mobile phones; wherein the server comprises a position information receiver and a data processor; wherein the position information receiver of the server is configured to receiving the position information of the wearable terminal transmitting from the plurality of mobile phones; wherein the data processor is configured to process the position information of the wearable terminal as position coordinates.

2. The BLUETOOTH® indoor positioning system of claim 1, wherein the server further comprises an information pusher configured to push business information to the wearable terminal according to the position coordinates from the data processor.

3. The BLUETOOTH® indoor positioning system of claim 2, wherein the wearable terminal further comprises an information receiver configured to receive information pushed by the server.

4. The BLUETOOTH® indoor positioning system of claim 3, wherein the wearable terminal further comprises an information displayer configured to display the information pushed by the server.

5. The BLUETOOTH® indoor positioning system of claim 1, wherein a number of the mobile phone is at least four.

6. A method for BLUETOOTH® indoor position executed by a BLUETOOTH® indoor positioning system, the BLUETOOTH® indoor positioning system comprising a plurality of mobile phones, a wearable terminal and a server, each of the mobile phone comprising a BLUETOOTH® signal transmitter, a position information receiver, a position information transmitter and a BLUETOOTH® RF antenna, the wearable terminal comprising a BLUETOOTH® signal receiver, a BLUETOOTH® signal feeder, an information receiver, the server comprising a position information receiver and a data processor, the method comprising: providing a signal coverage area by a plurality of mobile phones in an indoor location, and transmitting BLUETOOTH® signals to outside by the BLUETOOTH® signal transmitter via the BLUETOOTH® RF antenna of the mobile phone; receiving the signal coverage area by the BLUETOOTH® signal receiver of the wearable terminal; feeding back the BLUETOOTH® signals by the BLUETOOTH® signal feeder of the wearable terminal to the plurality of mobile phones via the BLUETOOTH® RF antenna of the wearable terminal, when the BLUETOOTH® signal receiver receiving the signal coverage area formed by the plurality of mobile phones; receiving the BLUETOOTH® signals by the position information receiver of the mobile phone via the BLUETOOTH® RF antenna of the mobile phone, and automatically generating position information of the wearable terminal; transmitting the position information to the server by the position information transmitter of the mobile phone via the BLUETOOTH® RF antenna of the mobile phone; receiving the position information of the wearable terminal transmitting from the plurality of mobile phones by the position information receiver of the server; and processing the position information of the wearable terminal by the data processor of the server to be position coordinates.

7. The method for BLUETOOTH® indoor position of claim 6, further comprising pushing business information by the server to the wearable terminal, according to the position coordinates from the data processor.

8. The method for BLUETOOTH® indoor position of claim 7, further comprising receiving and displaying the business information from the server by the wearable terminal.

* * * * *